United States Patent
Joo et al.

(10) Patent No.: US 10,454,087 B2
(45) Date of Patent: Oct. 22, 2019

(54) SEPARATOR FOR LITHIUM SECONDARY BATTERY AND LITHIUM SECONDARY BATTERY CONTAINING THEREOF

(71) Applicant: SK Innovation Co., Ltd., Seoul (KR)

(72) Inventors: Dong Jin Joo, Daejeon (KR); Yun Bong Kim, Daejeon (KR); Su Ji Lee, Daejeon (KR); Kyu Young Cho, Daejeon (KR)

(73) Assignees: SK Innovation Co., Ltd., Seoul (KR); SK IE Technology Co., Ltd., Seoul (KR)

( * ) Notice: Subject to any disclaimer, the term of this patent is extended or adjusted under 35 U.S.C. 154(b) by 31 days.

(21) Appl. No.: 15/484,200

(22) Filed: Apr. 11, 2017

(65) Prior Publication Data
US 2017/0294638 A1  Oct. 12, 2017

(30) Foreign Application Priority Data
Apr. 12, 2016 (KR) .................. 10-2016-0044917

(51) Int. Cl.
*H01M 2/16* (2006.01)
*H01M 10/0525* (2010.01)

(52) U.S. Cl.
CPC ......... *H01M 2/1686* (2013.01); *H01M 2/166* (2013.01); *H01M 2/1653* (2013.01); *H01M 10/0525* (2013.01)

(58) Field of Classification Search
CPC .. H01M 2/1653; H01M 2/166; H01M 2/1686; H01M 10/0525
See application file for complete search history.

(56) References Cited

U.S. PATENT DOCUMENTS

| 2009/0111025 | A1  | 4/2009 | Lee et al. | |
| 2013/0101888 | A1* | 4/2013 | Katayama | H01M 2/1653 429/144 |
| 2015/0263325 | A1* | 9/2015 | Honda | H01M 10/0525 429/145 |

FOREIGN PATENT DOCUMENTS

KR  100775310 B1  11/2007

* cited by examiner

*Primary Examiner* — Brittany L Raymond
(74) *Attorney, Agent, or Firm* — The Webb Law Firm

(57) ABSTRACT

Provided are a separator for a lithium secondary battery in which an entire thickness of the separator and a ratio of a heat-resistant layer included in the separator satisfy specific ranges, respectively, and a battery including the same. The separator has significantly excellent heat resistance and mechanical strength, and it is possible to manufacture a high capacity and high output battery using the separator, thereby making it possible to significantly improve safety even in the high capacity and the high output battery.

5 Claims, No Drawings

SEPARATOR FOR LITHIUM SECONDARY BATTERY AND LITHIUM SECONDARY BATTERY CONTAINING THEREOF

CROSS-REFERENCE TO RELATED APPLICATION

This application claims priority to Korean Patent Application No. 10-2016-0044917 filed Apr. 12, 2016, the disclosure of which is hereby incorporated in its entirety by reference.

TECHNICAL FIELD

The following disclosure relates to a separator for a lithium secondary battery capable of having excellent physical and electrochemical safety, a method of manufacturing the same, and a high-safety lithium secondary battery including the same.

BACKGROUND

In accordance with enlargement of use of a lithium ion secondary battery, there is a need to allow lithium ion secondary battery to have high capacity and a large area, but it is difficult to secure safety of the battery due to an increase in energy accumulated in the battery caused by an increase in capacity of the battery. It is essential to secure safety of a battery in accordance with the increase in capacity of a lithium second battery. Recently, research for improving safety of the battery has been significantly spotlighted.

In order to secure and improve safety of the lithium secondary battery, physical and electrochemical safety of a separator among various components contained in the lithium secondary battery is particularly important. As a generally used separator for a lithium secondary battery, a polyolefin based microporous thin film made of a polyethylene or polypropylene material has been used. In the case of the polyolefin based separator as described above, thermal safety of a main material forming the separator itself is not high, such that a microporous film may be easily damaged or deformed by an increase in temperature generated by an abnormal behavior of the battery. In addition, a short-circuit may occur between electrodes due to a damage or deformation of the microporous film, and there is a risk of over-heating, igniting or an explosion of the battery. Recently, a number of battery ignition or explosion cases have been reported, and these cases are due to lack of securing safety which should be essentially accompanied depending on an increase in capacity of the battery. Therefore, there is a need to develop a battery of which safety is improved in addition to high capacity, and in order to develop this battery, research into a technology capable of improving safety in accordance with high capacity of the battery by imparting a novel separate property to a separator has been conducted.

As the easiest method for improving safety of the battery, there is a method of increasing a thickness of a separator. However, in this method, mechanical strength, or the like, may be improved depending on an increase in thickness of the separator, but capacity and output of the battery are deteriorated, and this method is not suitable for miniaturization of the battery.

As one of methods for improving safety of the battery, a method of improving safety of the battery by forming a coating layer containing an inorganic material on a polyolefin based film to improve thermal safety of a separator has been used. An example of this method, a separator in which an active layer coated with a mixture of inorganic particles and a polymer binder is formed on a polyolefin microporous film has been disclosed in Korean Patent No. 0775310. In addition, a separator of which thermal safety is improved by forming a coating layer containing inorganic particles on non-woven fabric without using a polyolefin based porous film has been developed.

However, these separators may be unsuitable for being used to secure safety of a recent battery of which capacity has been increased in view of thermal and electrochemical safety of the separator. Particularly, in the case of using the non-woven fabric, the separator may be damaged during a process of assembling the battery due to low strength of the non-woven fabric itself, and may also be damaged in the battery even by weak impact applied to the battery, such that the non-woven fabric is unsuitable for securing safety.

RELATED ART DOCUMENT

Patent Document (Patent Document 1) Korean Patent No. 0775310

SUMMARY

An embodiment of the present invention is directed to providing a novel separator capable of improving capacity and output of a battery, and having excellent heat resistance and mechanical strength, and a battery including the same.

In one general aspect, there are provided a separator for a lithium secondary battery, including a polyolefin based porous base layer; and a heat-resistant layer formed on one surface or both surfaces of the polyolefin based porous base layer, wherein the heat-resistant layer is made of a mixture containing inorganic particles and a polymer binder, and the separator for a lithium secondary battery satisfies Equation (1): 10 μm≤entire thickness $T_t$ of separator≤40 μm, and Equation (2): 0.9≤total thickness $T_1$ of heat-resistant layer/thickness $T_2$ of base layer, and a lithium secondary battery including the same.

DETAILED DESCRIPTION OF EMBODIMENTS

Hereinafter, the present invention will be described in detail. A description for the known function and configuration obscuring the present invention will be omitted in the following description and the accompanying drawings. Unless indicated otherwise in the specification, it is to be understood that all terms used in the specification are construed as meaning as those that are generally understood by those who skilled in the art.

The present invention relates to a separator for a lithium secondary battery capable of having thermal stability at a high temperature, being physically and electrochemically stable, and improving capacity and output of a battery, a method of manufacturing the same, and a lithium secondary battery including the same.

Only when a separator of a battery may maintain unique functions of the separator capable of separating a cathode and an anode even under conditions at which external force capable of causing deformation, a damage, a fracture, or the like, of the separator in a charged battery is applied or a temperature is rapidly increased, it is possible to manufacture a safe battery.

In general, as a method of manufacturing a safe battery, a thick separator may be used, or a separator in which a coating layer containing an inorganic material is formed on a base for a separator may be used. However, even though the coating layer containing the inorganic material is formed, in the case in which a thickness of the separator is not increased to a predetermined level, mechanical strength of the separator is weak, such that at the time of manufacturing a battery, the separator may be torn, and a fracture may be easily generated depending on a state of charge of the battery. On the contrary, in the case of increasing the thickness of the separator, stability of the battery may be improved, but capacity and output of the battery may be rapidly decreased. For example, in the case of increasing the coating layer containing the inorganic material, as an alternative method, there is a method of decreasing a thickness of a base while increasing a thickness of the coating layer containing the inorganic material on the base in order to decrease an entire thickness of the separator, but a decrease in thickness of the base results in decrease in strength, such that mechanical stability may be rapidly deteriorated. Therefore, there is a problem in that thicknesses of the separator and a component included in the separator become changed in accordance with development strategy, such as development of a battery having heat resistance, mechanical stability, and the like, in order to maintain unique functions of the separator itself even various abnormal phenomena occurring in the battery, development of a high-capacity battery in order to increase capacity and output of the battery, or the like.

In order to solve the existing problem as described above, the present invention provides a novel separator capable of enabling to manufacture a battery capable of being significantly safe while having excellent capacity and output. In more detail, the present invention provides a separator in which thicknesses of a base included in the separator and a heat-resistant layer, which is a coating layer containing an inorganic material, are characteristic, thereby making it possible to provide a novel separator capable of having heat resistance and mechanical strength in addition to increases in capacity and output of a battery, which are impossible to be simultaneously implemented in an existing separator, and a battery including the same.

The present invention provides a separator for a lithium secondary battery including a polyolefin based porous base layer and a heat-resistant layer formed on one surface or both surfaces of the polyolefin based porous base layer, wherein the separator for a lithium secondary battery satisfies the following Equations (1) and (2).

$$10 \ \mu m \leq T_t \leq 40 \ \mu m \quad \text{Equation (1)}$$

$$0.9 \leq T_1/T_2 \quad \text{Equation (2)}$$

In Equation (1), $T_t$ is an entire thickness of the separator, and in Equation (2), $T_1$ is a total thickness (μm) of the heat-resistant layer, and $T_2$ is a thickness (μm) of the base layer.

According to the present invention, in the case of manufacturing a battery using a separator satisfying Equations (1) and (2) among separators having tensile strength of 1 kgf/cm or more, it is possible to manufacture a battery having high capacity and excellent safety.

In the present invention, the entire thickness $T_t$ of the separator, which is a thickness including the thicknesses of the base layer of the separator and the heat-resistant layer formed on one surface or both surfaces of the base layer, is in a range of 10 to 40 μm (10 μm≤$T_t$≤40 μm). In the case in which the entire thickness of the separator is less than 10 μm, the thickness of the base layer and an absolute thickness of the heat-resistant layer are thinned, such that it is impossible to secure safety of the battery, and it is also impossible to achieve an effect of improving safety by adjusting a ratio of the heat-resistant layer and the separator. In the case in which the entire thickness of the separator is more than 40 μm, safety may be improved, but it is difficult to increase capacity and output of the battery, such that it is difficult to achieve the object of the present invention.

According to an exemplary embodiment of the present invention, even in the case in which a ratio $T_1/T_2$ of a thickness $T_1$ of the heat-resistant layer to a thickness $T_2$ of the base layer in the separator is 0.9 or more, when the entire thickness of the separator is about 10 μm, safety of the battery is significantly changed, and even in the case in which the ratio $T_1/T_2$ of the thickness $T_1$ of heat-resistant layer to the thickness $T_2$ of the base layer in the separator is 0.9 or more, when the entire thickness of the separator is about 40 μm, capacity of the battery is significantly changed. Further, even in the case in which the entire thickness $T_t$ of the separator satisfies 10 μm≤$T_t$≤40 μm, when the ratio $T_1/T_2$ of the thickness $T_1$ of the heat-resistant layer to the thickness $T_2$ of the base layer in the separator is about 0.9, capacity or safety of the battery may be significantly changed.

In the present invention, the base layer may be a polyolefin based microporous base layer and be a microporous stretched film manufactured by stretching a polyolefin resin. The polyolefin based microporous base layer uniformly includes micropores, thereby making it possible to suppress internal short-circuit caused by unevenness of a surface of an electrode or impurities while allowing ions to smoothly flow. In addition, mechanical strength such as penetration strength or durability of the polyolefin based microporous base layer is relatively excellent as compared to a non-woven fabric type base layer. It is preferable that the polyolefin based microporous base layer is made of one or more polyolefin resins selected from the group consisting of polyethylene, polypropylene, and copolymers thereof, but the polyolefin based microporous base layer is not limited thereto. The polyolefin based microporous base layer may be a microporous stretched film manufactured by stretching a monolayer or multilayer polyolefin based resin, and inorganic particles, organic particles, or a mixture thereof may be contained in the polyolefin resin.

In the present invention, the heat-resistant layer contains inorganic particles and a polymer binder, and the inorganic particles are connected and fixed by the polymer binder and formed on one surface or both surfaces of the base layer of the separator. Since the porous base layer is manufactured by stretching, stress to allow the porous base layer to be shrunk in a stretched direction remains, and a degree of shrinkage is increased at the time of an increase in temperature, but the heat-resistant layer may solve a shrinkage problem at a high temperature, such that thermal stability of the battery may be improved.

The inorganic particles contained in the heat-resistant layer may be preferably inorganic particles made of one or more selected from the group consisting of aluminum oxides such as alumina, Boehmite, and the like, barium titanium oxide, titanium oxide, magnesium oxide, clay, glass powder, boron nitride, and aluminum nitride, but are not limited thereto.

The polymer binder contained in the heat-resistant layer may be preferably one or more polymer binders selected from the group consisting of polyvinylidene fluoride-hexafluoropropylene (PVdF-HFP), polymethylmethacrylate (PMMA), polyacrylonitrile (PAN), polyvinylpyrrolidone, polyimide, polyethylene oxide (PEO), cellulose acetate, polyvinylalcohol (PVA), carboxymethyl cellulose (CMC), and polybutylacrylate, but is not limited thereto.

The heat-resistant layer may contain 95 to 99 wt % of the inorganic particles and 5 to 1 wt % of the polymer binder, 90 to 99 wt % of the inorganic particles and 10 to 1 wt % of the polymer binder, 85 to 99 wt % of the inorganic particles and 15 to 1 wt % of the polymer binder, 80 to 99 wt % of the inorganic particles and 20 to 1 wt % of the polymer binder, 75 to 99 wt % of the inorganic particles and 25 to 1 wt % of the polymer binder, 70 to 99 wt % of the inorganic particles and 35 to 1 wt % of the polymer binder, 65 to 99 wt % of the inorganic particles and 35 to 1 wt % of the polymer binder, 60 to 99 wt % of the inorganic particles and 40 to 1 wt % of the polymer binder, 55 to 99 wt % of the inorganic particles and 45 to 1 wt % of the polymer binder, 50 to 99 wt % of the inorganic particles and 50 to 1 wt % of the polymer binder, or 45 to 99 wt % of the inorganic particles and 55 to 1 wt % of the polymer binder, based on 100 wt % of the entire composition of the heat-resistant layer, but is not limited thereto. The inorganic particles contained in the heat-resistant layer may have an average particle size of 0.1 to 5.0 μm, 0.1 to 4.5 μm, 0.1 to 4.0 μm, 0.1 to 3.5 μm, 0.1 to 3.0 μm, 0.1 to 2.0 μm, 0.1 to 1.5 μm, 0.1 to 1.0 μm, 0.5 to 5.0 μm, 0.5 to 4.5 μm, 0.5 to 4.0 μm, 0.5 to 3.5 μm, 0.5 to 3.0 μm, 0.5 to 2.5 μm, 0.5 to 2.0 μm, 0.5 to 1.5 μm, 0.5 to 1.0 μm, 1.0 to 5.0 μm, 1.0 to 4.5 μm, or 1.0 to 4.0 μm, but are not limited thereto. In the case in which a content and size of the inorganic particles contained in the entire composition of the heat-resistant layer satisfy the above-mentioned ranges, it is possible to prevent decreases in sizes of pores and porosity due to a decrease in empty spaces formed between the inorganic particles, and the inorganic particles may be uniformly distributed, such that performance of the battery may be improved.

The kind of inorganic particles contained in the heat-resistant layer, the kind of polymer binder, and the size of the inorganic particles may be freely selected and used as long as they do not particularly affect heat resistance and mechanical and electrochemical stability in the present invention, which are characterized by the thicknesses of the base layer and the heat-resistant layer included in the separator and the entire thickness of the separator, and thus may be used in the battery.

The ratio of the total thickness (μm) of the heat resistance layer included in the separator to the thickness (μm) of the base layer included in the separator satisfies $0.9 \leq T_1/T_2$ when the total thickness of the heat-resistant layer is $T_1$, and the thickness of the base layer is $T_2$. In the case in which the heat-resistant layer is formed on both surfaces of the base layer, the total thickness of the heat-resistant layer is a sum of a thickness of each of the heat-resistant layers formed on both surfaces of the base layer.

In order to manufacture the novel separator to be desired in the present invention and the battery including the same, among separators having strength of a predetermined level or more, the ratio of the total thickness of a heat-resistant layer of the separator to the thickness of the base layer, and the entire thickness of the separator need to be associated with each other to satisfy the specific ranges.

In the present invention, among the separators having tensile strength of 1 Kgf/cm or more, only when a separator satisfies $10 \ \mu m \leq T_t \leq 40 \ \mu m$ (which is the range of the entire thickness $T_t$ of the separator) and $0.9 \leq T_1/T_2$ (which is the range of the ratio of the total thickness $T_1$ of the heat-resistant layer to the thickness $T_2$ of the base layer), it is possible to manufacture a novel separator capable of increasing capacity and output while having excellent heat resistance and mechanical stability, and the battery including the same.

Generally, when a thickness of a separator is increased, it is difficult to increase capacity and output of a battery, and in the case in which the thickness of the separator is more than 40 μm, technically, it is significantly difficult to increase capacity and output of a lithium secondary battery using an existing method. In the case of a separator having a thickness of 10 μm or less, it may be easy to increase capacity and output of the lithium secondary battery, but it is significantly difficult to improve heat resistance and mechanical stability. Further, in the case in which the thickness of the separator is less than 10 μm, generally, the separator may be significantly easily damaged or deformed by abnormal phenomena such as external force applied to the battery, an increase in temperature occurring in the battery, and the like, it is highly likely that safety of the battery is not secured. That is, technically, it is difficult to manufacture a safe battery while increasing capacity and output of the battery by adjusting an entire thickness of a separator.

However, according to the present disclosure, when the entire thickness of the separator is in a range in which capacity and output of the battery may be improved, and the ratio of the thicknesses of the heat-resistant layer and the base layer included in the separator is adjusted in a specific range, heat resistance and mechanical strength are significantly improved. Heat resistance may be confirmed through a shrinkage rate at a high temperature, and mechanical strength may be confirmed through a penetration test on the separator depending on a state of charge of the battery. Heat resistance and mechanical strength are significantly increased by adjusting the ratio of the thicknesses of the heat-resistant layer and the base layer so as to be in a specific critical point range within the entire thickness of the separator set in the present invention.

According to the exemplary embodiment of the present invention, among the separators having tensile strength of 1 Kgf/cm or more, in the case in which a separator satisfies only one of $10 \ \mu m \leq T_t \leq 40 \ \mu m$ (which is a range of the entire thickness $T_t$ of the separator) and $0.9 \leq T_1/T_2$ (which is a range of the ratio of the total thickness $T_1$ of the heat-resistant layer to the thickness $T_2$ of the base layer), capacity or output of the battery may not be increased, or heat resistance or mechanical strength thereof may be rapidly deteriorated. It may be appreciated that when the entire thickness $T_t$ of the separator is less than 10 μm, even though $0.9 \leq T_1/T_2$ (which is the range of the ratio of the total thickness $T_1$ of the heat-resistant layer to the thickness $T_2$ of the base layer) is satisfied, a shrinkage rate of the separator is significantly increased, or the separator does not pass a penetration test, such that both heat resistance and mechanical strength are rapidly deteriorated. Further, when the entire thickness $T_t$ of the separator is more than 40 μm, in the case in which $0.9 \leq T_1/T_2$ (which is the range of the ratio of the total thickness $T_1$ of the heat-resistant layer to the thickness $T_2$ of the base layer) is satisfied, heat resistance or mechanical strength may be improved, but it is difficult to expect to increase capacity or output of the battery.

As long as the separator satisfies $10 \ \mu m \leq T_t \leq 40 \ \mu m$ (which is the range of the entire thickness $T_t$ of the separator), thicknesses of the base layer and the heat-resistant layer capable of satisfying $0.9 \leq T_1/T_2$ (which is the range of the ratio of the total thickness $T_1$ of the heat-resistant layer to the thickness $T_2$ of the base layer) are not limited, and as a ratio of the heat-resistant layer is increased, heat resistance and safety may be further improved. However, since it is apparent that it is impossible to continuously increase the ratio of the heat-resistant layer to manufacture the separator, and in the case of continuously increasing the ratio of the heat-resistant layer, the separator is not suitable for being actually used to manufacture a battery. Therefore, in the case in which a ratio of a heat-resistant layer of a separator is 0.9 or more and the separator may be used to manufacture a battery, the object of the present invention may be achieved. According to the exemplary embodiment of the present invention, when the ratio (%) of the heat-resistant layer is 90% or more to 233%, the separator desired in the present invention may be manufactured, but the present invention is not limited thereto. As long as the ratio (%) of the heat-resistant layer is 90% or more, the separator may be easily manufactured and used except for the case in which the separator is not suitable for manufacturing a battery due to a fracture of the separator, or the like.

According to the present invention, as long as the entire thickness $T_t$ satisfies 10 μm≤$T_t$≤40 μm, the total thickness $T_1$ of the heat-resistant layer and the thickness $T_2$ of the base layer may be easily adjusted as long as the ratio of the heat-resistant layer is 0.9 or more. According to the exemplary embodiment of the present invention, as long as the total thickness $T_1$ of the heat-resistant layer satisfies 7.0 μm≤$T_1$≤22.0 μm and the thickness $T_2$ of the base layer satisfies 4.0 μm≤$T_2$≤16.0 μm, heat resistance, mechanical strength, and capacity of the battery may be significantly improved. However, ranges of the total thickness of the heat-resistant layer and the base layer according to the exemplary embodiment of the present invention are not limited, and may be easily adjusted as long as the entire thickness of the separator satisfies 10 μm≤$T_t$≤40 μm and the ratio of the heat-resistant layer is 0.9 or more.

The separator according to the present invention hardly shrunk at a high temperature, and has excellent penetration strength, thereby making it possible to significantly improve safety of the battery and increase capacity and output of the battery. Further, tensile strength of the separator is high, such that it is easy to manufacture the separator and the battery, and durability may also be excellent.

The separator and the battery according to the present invention may be manufactured by general methods used in the art to which the present invention pertains, and the methods of manufacturing the separator and the battery are not particularly limited. For example, as the method of manufacturing a separator, a bar coating method, a rod coating method, a die coating method, a wire coating method, a comma coating method, a micro-gravure/gravure method, a dip coating method, a spray method, an ink-jet coating method, a mixing method thereof, a modified method thereof, or the like, may be used.

A lithium secondary battery including the separator according to the present invention may be manufactured to include a cathode, an anode, and a non-aqueous electrolyte.

The cathode and the anode may be manufactured by mixing and stirring a cathode active material and an anode active material with a solvent, if necessary, a binder, a conducting material, a dispersant, and the live, to prepare electrode mixtures, respectively, applying (coating) and drying the electrode mixtures on current collectors of a metal material, and then pressing the applied electrode mixtures, respectively.

As the cathode active material, an active material generally used in a cathode of a secondary battery may be used. For example, lithium metal oxide particles containing one or more metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof may be used.

As the anode active material, an active material generally used in an anode of the secondary battery may be used. As an example, in the lithium secondary battery, the anode active material may be a material capable of intercalating lithium. As a non-restrictive example, the anode active material may be at least one material selected from the anode active material group consisting of lithium (metal lithium), easily graphitizable carbon, hardly graphitizable carbon, graphite, silicon, a Sn alloy, a Si alloy, a Sn oxide, a Si oxide, a $T_1$ oxide, a Ni oxide, a Fe oxide (FeO), and lithium-titanium oxides ($LiTiO_2$, $Li_4Ti_5O_{12}$), or be a composite of at least two materials selected from the anode active material group.

As the conductive material, a general conductive carbon material may be used without particular limitation.

As the current collect of the metal material, any metal may be used as long as it do not have reactivity in a voltage range of a battery as a metal capable of being easily adhered to the electrode mixture of the cathode or anode active material while having high conductivity. As a non-restrictive example of a cathode current collector, there is foil made of aluminum, nickel or a combination thereof, or the like, and as a non-restrictive example of an anode current collector, there is foil made of copper, gold, nickel, a copper alloy, or a combination thereof, or the like.

The separator is interposed between the cathode and the anode, and as a method of applying the separator to the battery, a method of laminating (stacking) the separator and electrodes, a folding method, and the like, as well as a winding method, which is a general method, may be used.

In the present invention, the non-aqueous electrolyte contains a lithium salt corresponding to an electrolyte and an organic solvent, and as the lithium salt, any lithium salt may be used without limitation as long as it is generally used in an electrode for a lithium secondary battery, and may be represented by $Li^+X^-$.

An anion of the lithium salt is not particularly limited, but any one or more selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, and $(CF_3CF_2SO_2)_2N^-$ may be used.

As the organic solvent, any one or a mixture of two or more selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, sulfolane, gamma-butyrolactone, and tetrahydrofuran may be used.

The non-aqueous electrolyte is injected into an electrode structure composed of the cathode, the anode, and the separator interposed between the cathode and the anode.

There is no particular limitation in an outer shape of the lithium secondary battery, but the lithium secondary battery may be a cylindrical or prismatic battery using a can, a pouch-type or coin-type battery, or the like.

Hereinafter, the present invention will be described in detail through Examples. The following Examples are described in order to assist in understanding the exemplary embodiment of the present invention, but the present invention is not limited thereto.

Characteristics of separators for a secondary battery and batteries manufactured in Examples according to the present invention and Comparative Examples were evaluated using the following test methods.

Measurement of Gas Permeability

A method of measuring gas permeability of the separator was measured according to Japanese Industrial Standard (JIS) P8117, and times required for 100 cc of air to pass through separators having an area of 1 inch$^2$ were recorded on a scale of seconds and compared with each other.

Measurement of Heat Shrinkage Rate

As a method of measuring a heat shrinkage rate of the separator at 130° C., after cutting the separator in a form of a square (10 cm×10 cm) to manufacture a test sample, an area of the test sample was measured using a camera and recorded before an experiment. Five sheets of A4 paper were placed on and below the test sample, respectively so that the test sample was positioned at the center of the paper, and four sides of the paper were fixed using clips. The test sample enclosed by the paper was kept in a hot-air dry oven at 130° C. for 1 hour. When the keeping was terminated, the test sample was picked up and the area of the separator was measured using the camera, and a shrinkage rate was calculated using the following Equation 1.

Shrinkage Rate (%)=(area before heating−area after heating)×100/area before heating  [Equation 1]

Measurement of Tensile Strength

Tensile strength of the separator was measured according to American Society for Testing and Materials (ASTM) standard D882, and after measuring tensile strength of the separator in a machine direction (MD) and a transverse direction (TD), respectively, the lower value of the measured values in the machine and transverse directions was defined as tensile strength of the separator. After each of the test samples was manufactured by cutting a separator in a form of a rectangle having a width of 15 mm and a height of 120 mm, values obtained by dividing strength (kgf) when the separator test samples were torn at the time of stretching the test samples at a rate of 500 mm/min, respectively, with the width (15 mm) of the test sample were recorded and compared with each other.

Evaluation of Penetration Strength

Each of the batteries manufactured in order to measure safety of the batteries was charged depending on state of charge (SOC), and then, nail penetration evaluation was performed thereon. Here, a diameter of a nail was 3.0 mm, and a penetration speed of the nail was all fixed to 80 mm/sec.

Example 1

Manufacturing of Cathode 94 wt % of LiCoO$_2$ as a cathode active material, 2.5 wt % of polyvinylidene fluoride as an additive, and 3.5 wt % of carbon-black as a conducting material were added to and stirred with N-methyl-2-pyrrolidone (NMP) corresponding to a solvent, thereby preparing uniform cathode slurry. The slurry was coated, dried and pressed on aluminum foil having a thickness of 30 μm, thereby manufacturing a cathode plate having a thickness of 150 μm.

Manufacturing of Anode 95 wt % of artificial graphite as an anode active material, 3 wt % of acrylic latex having a Tg of −52° C. as an additive, and 2 wt % of carboxymethyl cellulose (CMC) as a thickener were added to and stirred with water corresponding to a solvent, thereby preparing uniform anode slurry. The slurry was coated, dried and pressed on copper foil having a thickness of 20 μm, thereby manufacturing an anode plate having a thickness of 150 μm.

Manufacturing of Separator 94 wt % of alumina particles having an average particle size of 0.5 μm as inorganic particles, 2 wt % of polyvinyl alcohol having a melting temperature of 220° C. and a degree of saponification of 99%, and 4 wt % of acrylic latex having a Tg of −52° C. were added to and stirred with water corresponding to a solvent, thereby preparing uniform slurry for a heat-resistant layer. As a coating base, a polyolefin microporous product (ENPASS, SK Innovation) having a thickness of 9 μm was used, and the slurry for a heat-resistant layer was coated on both surfaces of the base using a slot coating die. A separator obtained by evaporating water corresponding to the solvent using a drier was wound in a roll form. Thicknesses of both surface heat-resistant layers measured after winding were 10.5 μm, respectively.

Manufacturing of Battery

Pouch-type batteries were each assembled by a stacking method using the cathode, the anode, and the separator, and an electrolyte in which 1M lithium hexafluorophosphate (LiPF$_6$) was dissolved in ethylene carbonate (EC)/ethylmethyl carbonate (EMC)/dimethyl carbonate (DMC) (3:5:2 (volume ratio)) was injected into each of the assembled batteries, thereby manufacturing high-capacity lithium secondary batteries. Capacity of all of the batteries was fixed to 5,400 mAh.

Example 2

A separator and a battery were manufactured by the same methods as in Example 1 except for using a polyolefin microporous film product (ENPASS, SK Innovation) having a thickness of 7 μm as a coating base and coating a heat-resistant layer on one surface of the base instead of both surfaces of the base at a thickness of 14 μm.

Example 3

Manufacturing of Cathode 94 wt % of LiCoO$_2$ as a cathode active material, 2.5 wt % of polyvinylidene fluoride as an additive, and 3.5 wt % of carbon-black as a conducting material were added to and stirred with N-methyl-2-pyrrolidone (NMP) corresponding to a solvent, thereby preparing uniform cathode slurry. The slurry was coated, dried and pressed on aluminum foil having a thickness of 30 μm, thereby manufacturing a cathode plate having a thickness of 150 μm.

Manufacturing of Anode 95 wt % of artificial graphite as an anode active material, 3 wt % of acrylic latex having a Tg of −52° C. as an additive, and 2 wt % of carboxymethyl cellulose (CMC) as a thickener were added to and stirred with water corresponding to a solvent, thereby preparing uniform anode slurry. The slurry was coated, dried and pressed on copper foil having a thickness of 20 μm, thereby manufacturing an anode plate having a thickness of 150 μm.

Manufacturing of Separator 94 wt % of Boehmite particles having an average particle size of 0.7 μm as inorganic particles, 2 wt % of polyvinyl alcohol having a melting temperature of 220° C. and a degree of saponification of 99%, and 4 wt % of acrylic latex having a Tg of −52° C. were added to and stirred with water corresponding to a solvent, thereby preparing uniform slurry for a heat-resistant layer. As a coating base, a polyolefin microporous product (ENPASS, SK Innovation) having a thickness of 9 μm was used, and a separator obtained by evaporating water corresponding to the solvent using a drier was wound in a roll form. Thicknesses of both surface heat-resistant layers measured after winding were 6 μm, respectively.

Manufacturing of Battery

Pouch-type batteries were each assembled by a stacking method using the cathode, the anode, and the separator, and an electrolyte in which 1M lithium hexafluorophosphate (LiPF6) was dissolved in ethylene carbonate (EC)/ethylmethyl carbonate (EMC)/dimethyl carbonate (DMC) (3:5:2 (volume ratio)) was injected into each of the assembled batteries, thereby manufacturing high-capacity lithium secondary batteries.

Capacity of all of the batteries was fixed to 5,400 mAh.

Example 4

A separator and a battery were manufactured by the same methods as in Example 1 except for using a polyolefin microporous film product (ENPASS, SK Innovation) having a thickness of 1 μm as a coating base and coating heat-resistant layers on both surfaces of the base at a thickness of 5 μm, respectively.

Example 5

A separator and a battery were manufactured by the same methods as in Example 3 except for using a polyolefin microporous film product (ENPASS, SK Innovation) having a thickness of 4 μm as a coating base and coating heat-resistant layers on both surfaces of the base at a thickness of 3.5 μm, respectively.

Example 6

A separator and a battery were manufactured by the same methods as in Example 1 except for using a polyolefin microporous film product (ENPASS, SK Innovation) having a thickness of 16 μm as a coating base and coating heat-resistant layers on both surfaces of the base at a thickness of 11 μm, respectively.

Example 7

A separator and a battery were manufactured by the same methods as in Example 3 except for using a polyolefin microporous film product (ENPASS, SK Innovation) having a thickness of 5 μm as a coating base and coating heat-resistant layers on both surfaces of the base at a thickness of 5 μm, respectively.

Example 8

A separator and a battery were manufactured by the same methods as in Example 1 except for using a polyolefin microporous film product (ENPASS, SK Innovation) having a thickness of 14 μm as a coating base and coating heat-resistant layers on both surfaces of the base at a thickness of 10.5 μm, respectively.

Comparative Example 1

A separator and a battery were manufactured by the same methods as in Example 1 except for using PET non-woven fabric having a thickness of 10 μm as a coating base and coating heat-resistant layers on both surfaces of the base at a thickness of 10 μm, respectively.

Comparative Example 2

A separator and a battery were manufactured by the same methods as in Example 1 except for using a polyolefin microporous film product (ENPASS, SK Innovation) having a thickness of 50 μm as a coating base and coating a heat-resistant layer on one surface of the base at a thickness of 5 μm.

Comparative Example 3

A separator and a battery were manufactured by the same methods as in Example 1 except for using a polyolefin microporous film product (ENPASS, SK Innovation) having a thickness of 16 μm as a coating base and coating heat-resistant layers on both surfaces of the base at a thickness of 3 μm, respectively.

Comparative Example 4

A separator and a battery were manufactured by the same methods as in Example 1 except for using a polyolefin microporous film product (ENPASS, SK Innovation) having a thickness of 12 μm as a coating base and coating heat-resistant layers on both surfaces of the base at a thickness of 4 μm, respectively.

Comparative Example 5

A separator and a battery were manufactured by the same methods as in Example 3 except for using a polyolefin microporous film product (ENPASS, SK Innovation) having a thickness of 7 μm as a coating base and coating heat-resistant layers on both surfaces of the base at a thickness of 3 μm, respectively.

Comparative Example 6

A separator and a battery were manufactured by the same methods as in Example 1 except for using a polyolefin microporous film product (ENPASS, SK Innovation) having a thickness of 20 μm as a coating base and coating heat-resistant layers on both surfaces of the base at a thickness of 8.5 μm, respectively.

Comparative Example 7

A separator and a battery were manufactured by the same methods as in Example 3 except for using a polyolefin microporous film product (ENPASS, SK Innovation) having a thickness of 4 μm as a coating base and coating heat-resistant layers on both surfaces of the base at a thickness of 2 μm, respectively.

Comparative Example 8

A separator and a battery were manufactured by the same methods as in Example 1 except for using a polyolefin microporous film product (ENPASS, SK Innovation) having a thickness of 20 μm as a coating base and coating heat-resistant layers on both surfaces of the base at a thickness of 10.5 μm, respectively.

Characteristics of the separators and the batteries manufactured in Examples 1 to 8 and Comparative Examples 1 to 8 are illustrated in the following Tables 1 and 2. A ratio (%) of the heat-resistant layer was calculated by (a total thickness of the heat-resistant layer/a thickness of the base layer)*100, and since changes in physical properties of the separator depending on decimals in the ratio of the separator were not large, the ratio was represented by raising decimals to the next whole number.

TABLE 1

| Category | (Unit) | Example 1 | Example 2 | Example 3 | Example 4 | Example 5 | Example 6 | Example 7 | Example 8 |
| --- | --- | --- | --- | --- | --- | --- | --- | --- | --- |
| Thickness of Base Layer | μm | 9.0 | 7.0 | 9.0 | 11.0 | 4.0 | 16.0 | 5.0 | 14.0 |
| Thickness of Heat-resistant layer | μm μm | 10.5 10.5 | 14.0 — | 6.0 6.0 | 5.0 5.0 | 3.5 3.5 | 11.0 11.0 | 5.0 5.0 | 10.5 10.5 |
| Entire Thickness | μm | 30.0 | 21.0 | 21.0 | 21.0 | 11.0 | 38.0 | 15.0 | 35.0 |
| Total Thickness of Heat-resistant layer/Thickness of Base Layer | | 2.333 | 2.000 | 1.333 | 0.909 | 1.750 | 1.375 | 2.000 | 1.500 |
| Ratio of Heat-resistant layer | % | 233% | 200% | 133% | 91% | 175% | 138% | 200% | 150% |
| Gas Permeability | sec/100 cc | 251 | 247 | 250 | 243 | 260 | 255 | 272 | 230 |
| Shrinkage Rate at 130° C. | % | 0.1 | 0.1 | 0.1 | 0.1 | 0.1 | 0.1 | 0.1 | 0.1 |
| Tensile Strength | Kgf/cm | 1.0 | 1.2 | 1.4 | 2.0 | 1.3 | 1.6 | 1.0 | 1.5 |
| Capacity of Battery | mAh | 5100 | 5400 | 5400 | 5400 | 5600 | 5000 | 5500 | 5100 |

| Category | (Unit) | Comparative Example 1 | Comparative Example 2 | Comparative Example 3 | Comparative Example 4 | Comparative Example 5 | Comparative Example 6 | Comparative Example 7 | Comparative Example 8 |
| --- | --- | --- | --- | --- | --- | --- | --- | --- | --- |
| Thickness of Base Layer | μm | 10.0 | 50.0 | 16.0 | 12.0 | 8.0 | 20.0 | 4.0 | 20.0 |
| Thickness of Heat-resistant layer | μm μm | 10.0 10.0 | 5.0 — | 3.0 3.0 | 4.0 4.0 | 3.5 3.5 | 8.5 8.5 | 2.0 2.0 | 10.5 10.5 |
| Entire Thickness | μm | 30.0 | 55.0 | 22.0 | 20.0 | 13.0 | 37.0 | 8.0 | 41.0 |
| Total Thickness of Heat-resistant layer/Thickness of Base Layer | | 2.000 | 0.100 | 0.375 | 0.666 | 0.875 | 0.850 | 1.000 | 1.050 |
| Ratio of Heat-resistant layer | % | 200% | 10% | 38% | 67% | 88% | 85% | 100% | 105% |
| Gas Permeability | sec/100 cc | 22 | 197 | 278 | 273 | 230 | 272 | 225 | 310 |
| Shrinkage Rate at 130° C. | % | 0.1 | 2.4 | 0.1 | 0.1 | 0.1 | 0.2 | 0.1 | 0.1 |
| Tensile Strength | Kgf/cm | 0.7 | 2.7 | 1.7 | 1.5 | 0.9 | 1.4 | 0.8 | 1.2 |
| Capacity of Battery | mAh | It was impossible to assemble battery | 4200 | 5400 | 5400 | 4100 | 4200 | It was impossible to assemble battery | 4300 |

TABLE 2

| Penetration Test | Example 1 | Example 2 | Example 3 | Example 4 | Example 5 | Example 6 | Example 7 | Example 8 |
|---|---|---|---|---|---|---|---|---|
| SOC = 100% | L3 (pass) | L3 (pass) | L3 (pass) | L3 (pass) | L3 (pass) | L3 (pass) | L3 (pass) | L3 (pass) |
| SOC = 90% | L3 (pass) | L3 (pass) | L3 (pass) | L3 (pass) | L3 (pass) | L3 (pass) | L3 (pass) | L3 (pass) |
| SOC = 80% | L3 (pass) | L3 (pass) | L3 (pass) | L3 (pass) | L3 (pass) | L3 (pass) | L3 (pass) | L3 (pass) |
| SOC = 70% | L3 (pass) | L3 (pass) | L3 (pass) | L3 (pass) | L3 (pass) | L3 (pass) | L3 (pass) | L3 (pass) |
| SOC = 60% | L3 (pass) | L3 (pass) | L3 (pass) | L3 (pass) | L3 (pass) | L3 (pass) | L3 (pass) | L3 (pass) |
| SOC = 50% | L3 (pass) | L3 (pass) | L3 (pass) | L3 (pass) | L3 (pass) | L3 (pass) | L3 (pass) | L3 (pass) |

| Penetration Test | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| SOC = 100% | The separator was torn, and it was impossible to assemble battery | L5 (fail) | L5 (fail) | L5 (fail) | L5 (fail) | L5 (fail) | The separator was torn, and it was impossible to assemble battery | L3 (pass) |
| SOC = 90% | | L5 (fail) | L5 (fail) | L5 (fail) | L5 (fail) | L5 (fail) | | L3 (pass) |
| SOC = 80% | | L5 (fail) | L5 (fail) | L5 (fail) | L5 (fail) | L5 (fail) | | L3 (pass) |
| SOC = 70% | | L5 (fail) | L5 (fail) | L5 (fail) | L5 (fail) | L3 (pass) | | L3 (pass) |
| SOC = 60% | | L5 (fail) | L3 (pass) | L3 (pass) | L5 (fail) | L3 (pass) | | L3 (pass) |
| SOC = 50% | | L5 (fail) | L3 (pass) | L3 (pass) | L5 (fail) | L3 (pass) | | L3 (pass) |

Characteristics results of the separators and batteries manufactured as described above were analyzed as follows.

In Examples, in the cases in which among the separators having tensile strength of 1.0 Kgf/cm or more (1.0 to 1.6 kgf/cm), the entire thickness of the separator was in a range of 11.0 to 38.0 μm and the ratio of the heat-resistant layer was 91% or more to 233% (thickness ratio of 0.909 to 2.333), all of the batteries manufactured using the separators of the Examples had high capacity (at least 5000 mAh), and penetration evaluation results depending on the states of charge of the batteries were all excellent.

In Comparative Example 1 in which the separator was manufactured using the non-woven fabric, even though the entire thickness of the separator was 30 μm and the ratio of the heat-resistant layer was 200%, tensile strength thereof was low (0.7 Kgf/cm), it was impossible to manufacture a normal battery. In Comparative Example 2, the entire thickness of the separator was excessively thick (55 μm), and the ratio of the heat-resistant layer was excessively low (10%), such that strength was significantly excellent but capacity of the battery was significantly low (4200 mAh), and when the state of charge was 50% or more, an internal short-circuit, and the like, occurred. Therefore, the battery did not pass the penetration test. Further, the shrinkage rate was also significantly high (2.4%). In Comparative Example 3, the entire thickness of the separator was 22 μm, and capacity of the battery was also high (5400 mAh), but the ratio of the heat-resistant layer was 38%, and when the state of charge was 80% or more, an internal short-circuit, and the like, occurred. Therefore, the battery did not pass the penetration test. In Comparative Example 4, the entire thickness of the separator was 20 μm, and capacity of the battery was also high (5400 mAh), but the ratio of the heat-resistant layer was 67%, and when the state of charge was 90% or more, an internal short-circuit, and the like, occurred. Therefore, the battery did not pass the penetration test. In Comparative Example 5, the entire thickness of the separator was 13 μm, and capacity of the battery was significantly low (4100 mAh), but the ratio of the heat-resistant layer was 88%, and when the state of charge was 50% or more, an internal short-circuit, and the like, occurred. Therefore, the battery did not pass the penetration test. In Comparative Example 6, the ratio of the heat-resistant layer was 85% and capacity of the battery was not high (4200 mAh), and when the state of charge was 80% or more, an internal short-circuit, and the like, occurred. Therefore, the battery did not pass the penetration test. In Comparative Example 7, the ratio of the heat-resistant layer corresponded to 100%, but the entire thickness of the separator was thin (8 μm) and strength was not suitable, such that it was impossible to manufacture a normal battery. In Comparative Example 8, the entire thickness of the separator was thick (41 μm), such that tensile strength was excellent, and the penetration evaluation result was good. However, capacity of the battery was significantly low (4300 mAh).

As a result of analyzing the Examples and the Comparative Example, in the cases of the separator of which the entire thickness was in a range of 10 to 40 μm and the ratio of the heat-resistant layer was 90% or more, among the separators having tensile strength of 1.0 Kgf/cm or more, capacity of the battery was high (at least 5000 mAh), and mechanical strength depending on the state of charge of the battery was also excellent. More specifically, in Comparative Example 1, the entire thickness of the separator was in a range of 10 to 40 μm and the ratio of heat-resistant layer was 90% or more, but strength of the base was weak, such that it was impossible to assemble the battery itself. In Comparative Example 7, the material of the base was different from that in Comparative Example 1, but even though the ratio of the heat-resistant layer was 90% or more, in the case in which the entire thickness of the separator was less than 10 μm, strength was weak, such that it was impossible to assemble the battery itself. In the case in which the entire thickness of the separator was excessively thick and the ratio of the heat-resistant layer was significantly low as in Comparative Example 2, capacity of the battery was significantly low, and a short-circuit of the battery easily occurred. Even though tensile strength was good and the ratio of the heat-resistant layer was 90% or more, in the case in which the entire thickness of the separator was 41 μm, which was closer to 40 μm but more than 40 μm, as in Comparative Example 8, capacity of the battery was rapidly decreased. Even though the entire thickness of the separator was in a range of 10 to 40 μm, in the case in which the ratio of the heat-resistant layer was low as in the separators in Comparative Examples 3 and 4, as the state of charge was increased, a short-circuit of the battery more easily occurred. Therefore, these separators were not suitable for being used in the battery. Even though the entire thicknesses of the separators were in a range of 10 to 40 μm, in the case in which the ratios of the heat-resistant layers were 88% and 85%, respectively, which were close to 90%, but were less than 90%, as in Comparative Examples 5 and 6, as the state of charge was increased, a short-circuit of the battery more easily occurred. Therefore, these separators were not suitable for being used in the battery.

On the contrary, among the Examples, in the case in which the entire thickness of the separator was in a range of 10 to 40 μm and the ratio of the heat-resistant layer was 91%, as in the separator in Example 4, capacity of the battery was significantly high, and mechanical strength was also excellent. Comparing this result with the measurement results in Comparative Examples 5 and 6, it may be appreciated that even though the entire thickness of the separator was in a range of 10 to 40 μm, in the case in which the ratio of the heat-resistant layer was about 90%, capacity of the battery or mechanical strength depending on the state of charge was significantly changed.

Further, in the case in which the entire thickness of the separator was 11 μm and the ratio of the heat-resistant layer was 90% or more as in the separator in Example 5, capacity of the battery was significantly high, and mechanical strength was also excellent. Comparing this result with the measurement result in Comparative Example 7, it may be appreciated that even though the ratio of the heat-resistant layer was 90% or more, in the case in which the entire thickness of the separator was about 10 μm, strength was significantly changed. For example, when the entire thickness of the separator was less than 10 μm, the separator was easily torn, such that it was impossible to use the separator in a battery. In the case in which the entire thickness of the separator was 38 μm and the ratio of the heat-resistant layer was 90% or more as in the separator in Example 6, capacity of the battery was significantly high, and mechanical strength was also excellent. Comparing this result with the measurement result in Comparative Example 8, it may be appreciated that even though the ratio of the heat-resistant layer was 90% or more, in the case in which the entire thickness of the separator was about 40 μm, capacity of the battery was significantly changed.

The separator according to the present invention may improve capacity and output of the battery, prevent the internal short-circuit, and be physically, chemically, and electrochemically stable even in the case of using the separator for a long period of time. In addition, the separator according to the present invention has excellent heat-resistance so that the separator is not shrunk or deformed even at a high temperature, thereby making it possible to suppress ignition or fracture by the abnormal phenomenon such as a rapid increase in temperature in the battery, and the like.

What is claimed is:

1. A separator for a lithium secondary battery comprising:
a polyolefin based microporous stretched film; and
a heat-resistant layer formed on one surface or both surfaces of the polyolefin based microporous stretched film,
wherein the heat-resistant layer is made of a mixture containing inorganic particles and a polymer binder, and the separator for a lithium secondary battery satisfies the following Equations (1) and (2):

$$10 \ \mu m \leq T_t \leq 40 \ \mu m \quad (1)$$

$$0.9 \leq T_1/T_2 \quad (2)$$

(in Equation (1), $T_t$ is an entire thickness of the separator, and in Equation (2), $T_1$ is a total thickness (μm) of the heat-resistant layer, and $T_2$ is a thickness (μm) of the microporous stretched film);
wherein the separator has a tensile strength of 1 kgf/cm or more; and
wherein, in the separator, the total thickness $T_1$ (μm) of the heat-resistant layer is 7.0 μm≤$T_1$≤22.0 μm, and the thickness $T_2$ (μm) of the microporous stretched film is 4.0 μm≤$T_2$≤16.0 μm.

2. The separator for a lithium secondary battery of claim 1, wherein the polyolefin based microporous stretched film is made of one or more polyolefins selected from the group consisting of polyethylene, polypropylene, and copolymers thereof.

3. The separator for a lithium secondary battery of claim 1, wherein the inorganic particles are inorganic particles made of one or more selected from the group consisting of aluminum oxides such as alumina, Boehmite, and the like, barium titanium oxide, titanium oxide, magnesium oxide, clay, glass powder, boron nitride, and aluminum nitride.

4. The separator for a lithium secondary battery of claim 1, wherein the polymer binder is one or more polymer binders selected from the group consisting of polyvinylidene fluoride-hexafluoropropylene (PVdF-HFP), polymethylmethacrylate (PMMA), polyacrylonitrile (PAN), polyvinylpyrrolidone, polyimide, polyethylene oxide (PEO), cellulose acetate, polyvinylalcohol (PVA), carboxymethyl cellulose (CMC), and polybutylacrylate.

5. A lithium secondary battery comprising the separator for a lithium secondary battery of claim 1.

* * * * *